United States Patent [19]

Sato et al.

[11] Patent Number: 5,166,746

[45] Date of Patent: Nov. 24, 1992

[54] AIRCRAFT DOCKING GUIDANCE SYSTEM WHICH TAKES POSITION REFERENCE IN ANTI-COLLISION LIGHT OF AIRCRAFT

[75] Inventors: Tetsuo Sato, Yokohama; Susumu Muranaka, Kawasaki, both of Japan

[73] Assignees: Toshiba Electronic Systems Co., Ltd.; Ana Motor Service Co., Ltd., both of Tokyo, Japan

[21] Appl. No.: 704,937

[22] Filed: May 23, 1991

[30] Foreign Application Priority Data

May 25, 1990 [JP] Japan .................................. 2-133908

[51] Int. Cl.⁵ .............................................. G01B 11/26
[52] U.S. Cl. ..................... 356/152; 340/958; 340/961; 356/4; 358/103
[58] Field of Search ............... 340/958, 961; 358/103; 356/4, 141, 152

[56] References Cited

U.S. PATENT DOCUMENTS

| | | | |
|---|---|---|---|
| 3,484,549 | 12/1969 | Ricketts et al. | 358/104 |
| 3,662,332 | 5/1972 | Zechnowitz et al. | 340/958 |
| 3,664,748 | 5/1972 | Bezu | 356/152 |
| 4,249,159 | 2/1981 | Stasko | 340/958 |
| 4,994,681 | 2/1991 | Mann | 340/958 |

OTHER PUBLICATIONS

Aerodrome Design Manual, Doc 9157-AN/901 Part 4, Second Edition-1983, pp. 4-123 to 4-131, "Visual Parking and Docking Guidance Systems".

*Primary Examiner*—Stephen C. Buczinski
*Attorney, Agent, or Firm*—Oblon, Spivak, McClelland, Maier & Neustadt

[57] ABSTRACT

A plurality of image pickup devices are set on the ground to pick up images of an anti-collision light located on an aircraft to be guided. A position reference producing section produces a signal representing a position reference of the aircraft in accordance with picked-up image signals from the plurality of image pickup devices. A display data producing section produces at least one of direction information and distance information as guidance information to be provided to pilots of the aircraft in accordance with the signal representing the position reference of the aircraft which is supplied from the position reference producing section. A display unit displays at least one of the direction information and distance information from the display data producing section at a position on the ground where the pilots can see and recognize the information.

8 Claims, 8 Drawing Sheets

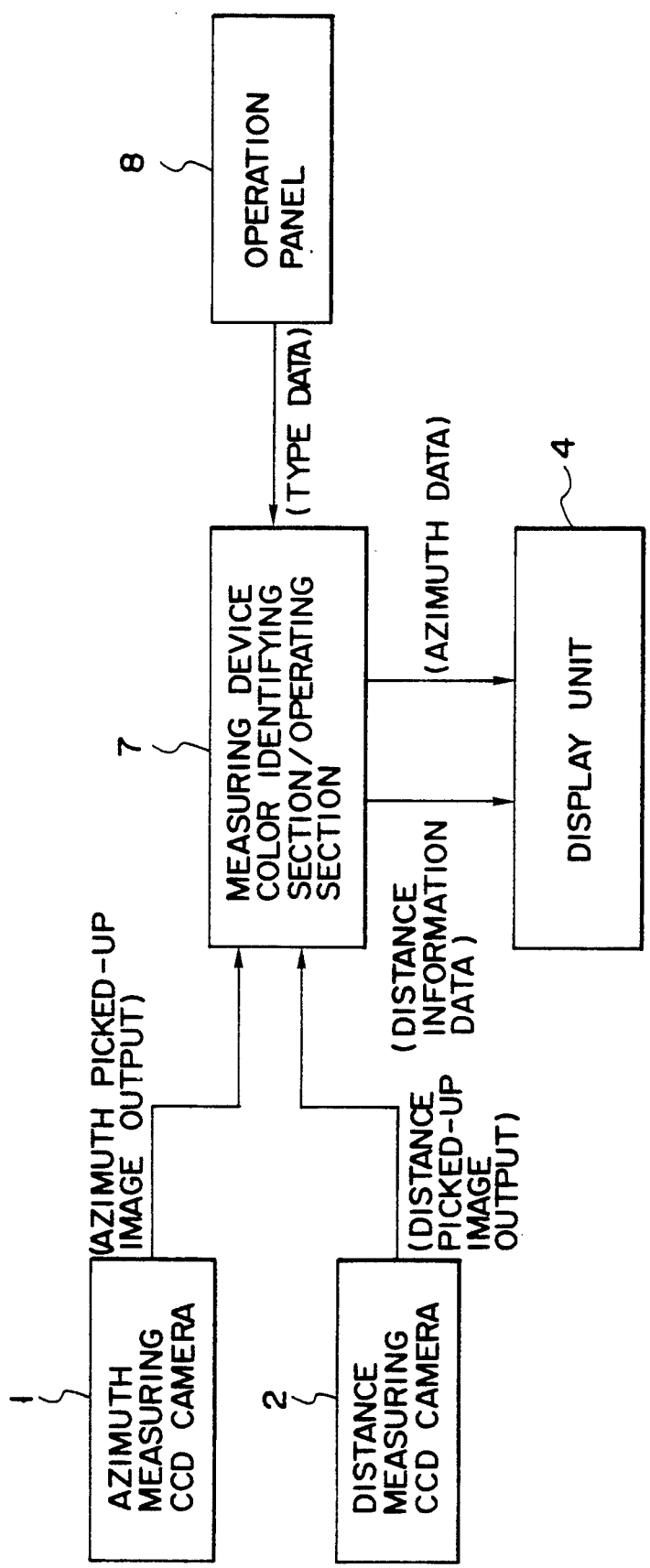
F I G. 2

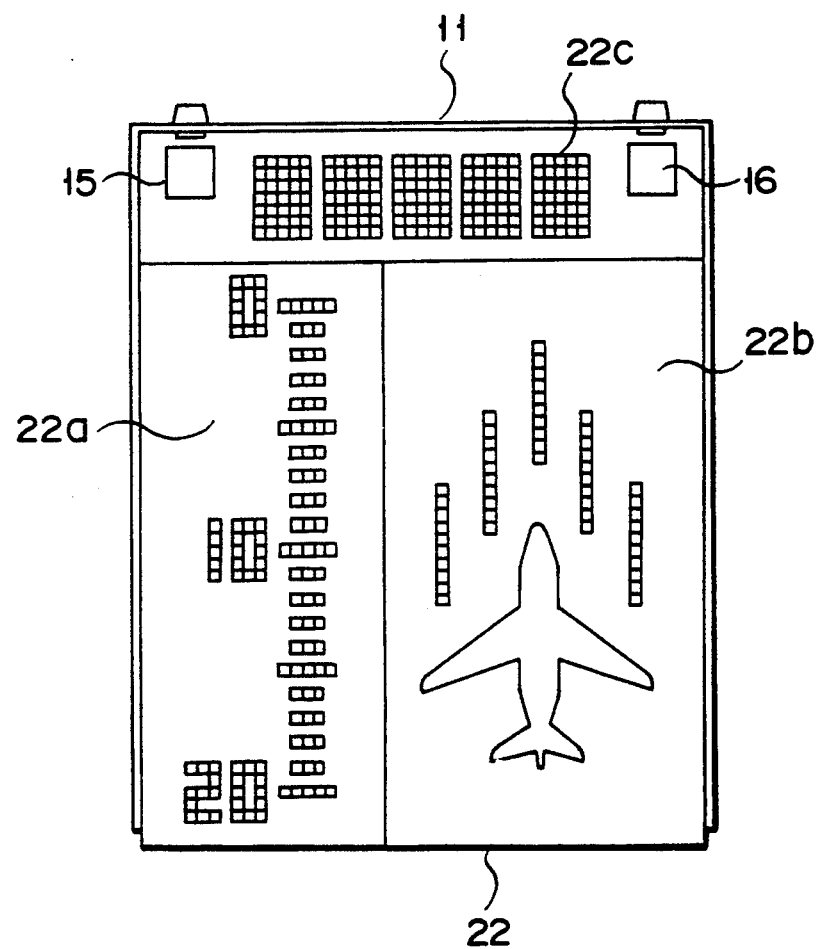
F I G. 3C

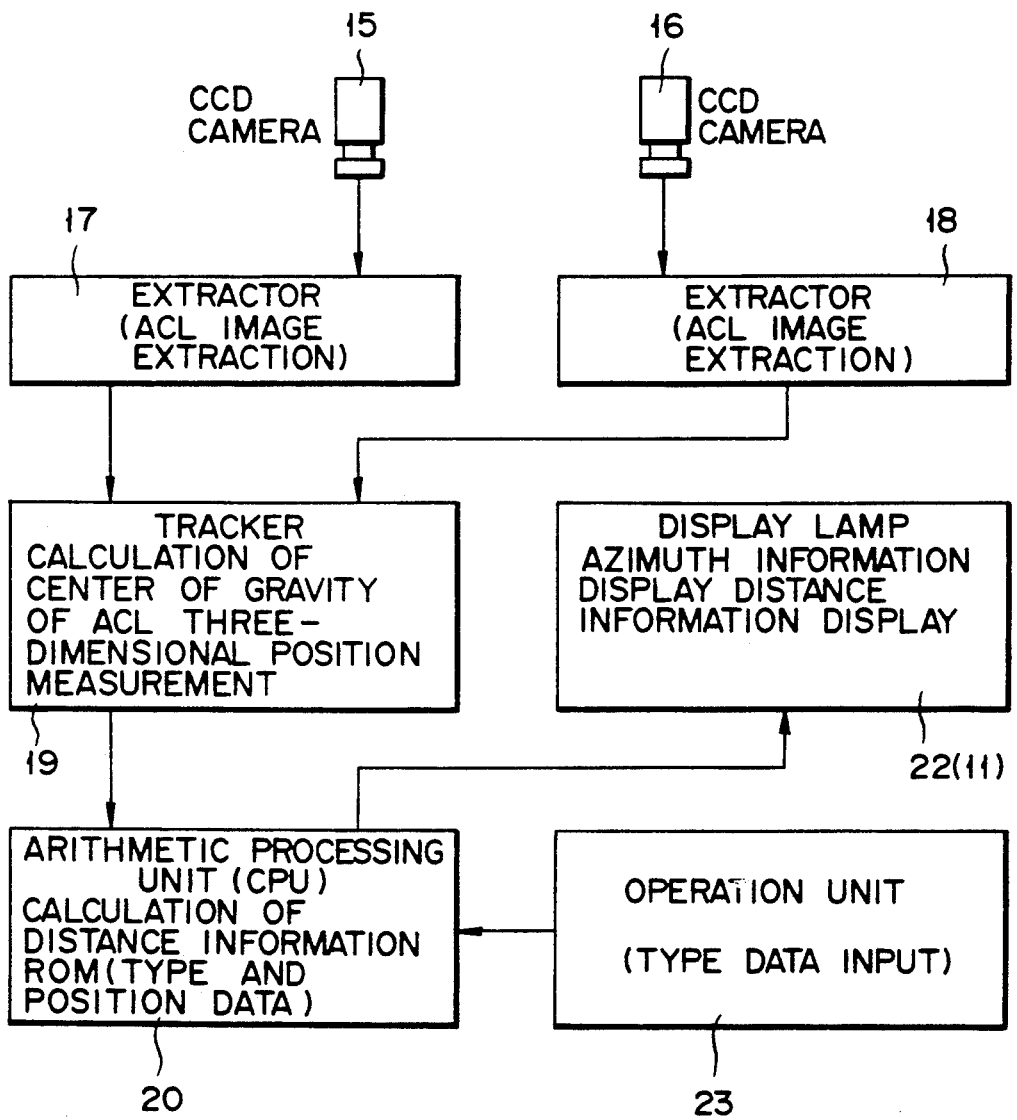
F I G. 4

AIRCRAFT DOCKING GUIDANCE SYSTEM WHICH TAKES POSITION REFERENCE IN ANTI-COLLISION LIGHT OF AIRCRAFT

BACKGROUND OF THE INVENTION

1. Field of the Invention

The present invention relates to an aircraft docking guidance system which provides pilots of taxing planes with data concerning distance and azimuth (direction) during movement across airport aprons to the parking spot. More particularly, this invention relates to an aircraft docking guidance apparatus for calculating a deviation from an approach line and a distance from a stop point to the nose gear in a parking spot by using a picked-up image of an anti-collision light (ACL) located on the upper fuselage of all aircraft as a position reference, and visually displaying the calculation results to a pilot as azimuth (direction) information and distance information by means of a display unit on the ground, thereby accurately guiding the aircraft from airport aprons to the parking spot.

2. Description of the Related Art

A conventional aircraft docking guidance apparatus is designed to provide azimuth (direction) and distance information by utilizing an optical technique. In this technique, however, since the parallax varies among pilots depending on the loading capacities of aircraft, sufficiently precise azimuth (direction) information cannot be obtained.

More specifically, in the conventional technique, of various types of schemes, azimuth (direction) information is obtained by mainly using the parallax of a pilot by optical applications, and a deviation from an approach line is displayed on a display unit installed on the ground. For this reason, proper azimuth (direction) information can be obtained at the captain's seat, but cannot be obtained at the co-pilot's seat. That is, only the captain can pilot the aircraft.

In the conventional technique, distance information is obtained by mainly using a sensor buried underground below an approach path. According to this technique, when the passage of wheels of an aircraft is detected, a remaining distance is displayed on a display unit. In this distance information display technique, however, installation and maintenance of this sensor interfere with flight operations of aircraft.

Furthermore, in the above-described azimuth and distance information display techniques, it is difficult to control different types of aircrafts with respect to the sam parking spot.

As another guidance technique, a distance measurement technique based on a laser is available. This technique, however, can only be applied to limited types of aircracts, because the reflectivity of a laser beam with respect to dark colors is low. In addition, it is difficult to properly use this technique in all kinds of weathers.

SUMMARY OF THE INVENTION

It is, therefore, an object of the present invention to provide a new and improved aircraft docking guidance system which takes a position reference in an anti-collision light of an aircraft, in which the position reference of the aircraft is obtained on the basis of picked-up image signals obtained by picking-up the anti-collision light of the aircraft by means of a plurality of image pickup devices on the ground, and azimuth (direction) information and distance information are generated in accordance with the position reference to be displayed on a display unit on the ground, thereby providing proper information not only to the captain's seat but also to the co-pilot's seat without requiring burying of a sensor in an apron, and allowing not only a pilot but also a co-pilot to accurately guide the aircraft to a parking spot without the support of ground staff.

According to one aspect of the present invention, there is provided an aircraft docking guidance apparatus comprising:

a plurality of image pickup devices, set on the ground, for picking up images of an anti-collision light located on an aircraft to be guided;

position reference producing means for producing a signal representing a position reference of the aircraft in accordance with picked-up image signals from the plurality of image pickup devices;

display data producing means for producing at least one of azimuth (direction) information and distance information as guidance information to be provided to pilots of the aircraft in accordance with the signal representing the position reference of the aircract which is supplied from the position reference producing means; and a display unit for displaying at least one of the azimuth (direction) information and distance information from the display data producing means at a position on the ground where the pilots can see and recognize the information.

More specifically, in order to achieve the above object, the present invention is characterized by comprising two charge coupled device (CCD) cameras, extractors, a tracker, an arithmetic processing unit, and a display unit constituted by a display lamp, which are arranged in the forward direction of an aircraft which approaches an apron, and an operation unit installed at an arbitrary position at which an operator on the ground can easily operate the operation unit.

According to the above-described arrangement, in the aircraft docking guidance apparatus of the present invention, an anti-collision light (to be referred to as an ACL hereinafter) located on an upper fuselage of each aircraft which is approaching the apron is imaged by the two CCD cameras, and the extractors extract only ACL red flashes from the picked-up image outputs. The tracker tracks the two color extraction images, and obtains the center of gravity of each ACL image. On the basis of the obtained two points, the tracker calculates one point of a three-dimensional space coordinate system defined on the basis of on a parking spot on the approach line as the origin. That is, the position of the ACL is three-dimensionally measured as the position reference of the aircraft, and tracking is performed with respect to the position reference. The arithmetic processing unit stores relative position data of ACLs and nose gears, approach line data, and parking spot data, which vary depending on aircraft types, in a read only memory (ROM) in advance. In the first step, the type of an approaching aircraft is selected by the operation unit. When the two CCD cameras image an ACL, the arithmetic processing unit calculates a deviation from the approach line as azimuth information and the distance from the parking spot to the nose gear as distance information, and displays the output information on the display lamp.

In order to achieve the above object, according to another aspect of the present invention, there is provided an aircraft docking guidance apparatus comprising an azimuth (direction) measuring image pickup device, installed in a forward direction of an aircraft which is approaching an apron, for picking up an image of an anti-collision light located on the aircraft which is approaching the apron, a distance measuring image pickup device, installed in a direction to face a side surface of an aircraft which is approaching the apron, for picking up an image of the anti-collision light of the aircraft which is approaching the apron, a measuring device for extracting an anti-collision light image from picked-up image outputs from the distance measuring image pickup device and the azimuth (direction) measuring image pickup device, calculating a difference between the center of the anti-collision light image and an aircraft approach line to obtain azimuth (direction) information, and calculating a distance from the center of the anti-collision light to a parking spot of the aircraft to obtain distance information, and a display unit for receiving and displaying the azimuth (direction) information and the distance information from the measuring device.

With the above-described arrangement, an ACL of an aircraft which is approaching the apron is imaged by the azimuth (direction) measuring image pickup device installed in the forward direction of the aircraft and by the distance measuring image pickup device installed in the direction to face a side surface of the aircraft, and an ACL image is extracted from picked-up image outputs from the respective image pickup devices. The difference between the center of the ACL and the approach line and the distance to the parking spot are calculated by the measuring device. The former information is displayed on the display unit as azimuth (direction) information; and the latter information, as distance information, thereby accurately guiding the aircraft to the parking spot.

According to still another aspect of the present invention, there is provided a method for providing a docking guidance to an aircraft, the method comprising the steps of:

picking up images of an anti-collision light located on an aircraft by using a plurality of image pickup devices;

producing a position reference of the aircraft on the basis of picked-up image signals from the plurality of image pickup devices; and producing at least one of azimuth (direction) information and distance information as the docking guidance in accordance with the position reference of the aircraft and providing the information to the aircraft through a display unit on the ground.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a block diagram showing an overall arrangement of the apparatus in FIG. 1;

FIG. 3C is a view showing a display unit of FIG. 3B;

FIG. 4 is a block diagram showing the overall arrangement of the apparatus in FIGS. 3A and 3B;

DETAILED DESCRIPTION OF THE PREFERRED EMBODIMENTS

Figure 1:
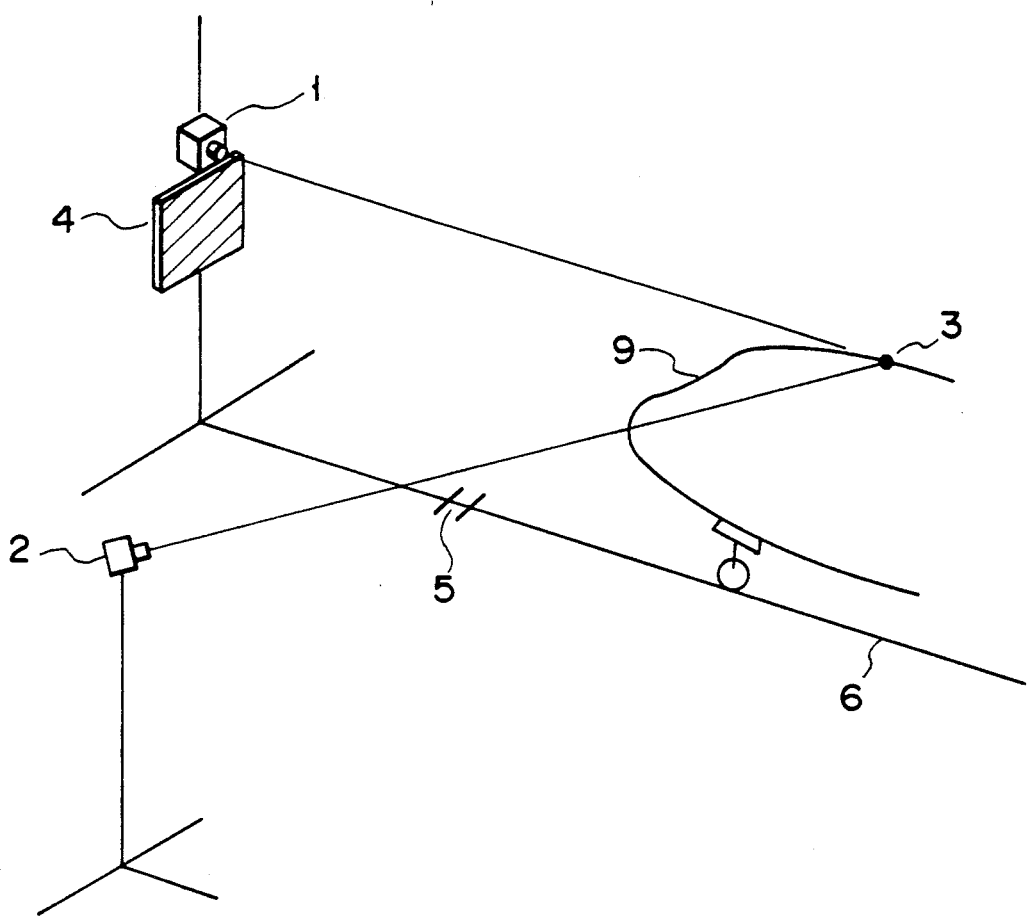
FIG. 1 is a view showing the system function of an aircraft docking guidance apparatus according to the first embodiment of the present invention.

Reference will now be made in detail to the presently preferred embodiments of the invention as illustrated in the accompanying drawings, in which like reference characters designate like or corresponding parts throughout the several drawings.

Embodiments of the present invention will be described with reference to the accompanying drawings.

FIG. 1 shows the system function of an aircraft docking guidance apparatus according to the first embodiment of the present invention. FIG. 2 shows the overall arrangement of the apparatus. An azimuth (direction) measuring image pickup device, e.g., a CCD camera 1, is set on the ground in the forward direction of an aircraft 9 at a position above an extension line of an aircraft approach line 6 formed on an apron. The CCD camera 1 picks up an image of an anti-collision light (ACL) 3 located on an upper fuselage of the aircraft 9 which is approaching the apron. Upon reception of an azimuth (direction) picked-up image output from the CCD camera 1, a measuring device 7 on the ground extracts a red image from a red flash generated by the ACL 3 through a color identifying section of the measuring device 7. At the same time, the coordinates of the center of the image are obtained by an operating section of the measuring device 7. According to the operation procedure of the apparatus of this embodiment, a switching operation is performed first through an operation panel 8 on the ground to select the type of approaching aircraft 9. Aircraft type data, data of the approach line 6, and parking spot data of each type of aircraft are stored in the operating section of the measuring device 7. Upon the above-mentioned switching operation, data of a corresponding aircraft type is selected.

The measuring device 7 obtains the difference between the center of the ACL 3, which is obtained by the operating section, and the approach line 6 as azimuth (direction) information by using the operating section, and displays the azimuth (direction) information on a display unit 4 on the ground.

If left and right coordinate values with reference to the approach line 6 are set to be $-2,560 \leq X \leq 2,550$, an azimuth (direction) precision of 2.1 cm is obtained at a point 200 m from the CCD camera 1 when the angle of field of view of the CCD camera 1 is $\pm 15°$.

A distance measuring image pickup device, e.g., a CCD camera 2, is set on the ground at one side of the approach line 6 (facing a side surface of the aircraft 9 which is approaching the apron). The CCD camera 2 picks up an image of the ACL 3 on the upper portion of the aircraft 9. Upon reception of a distance picked-up image output from the CCD camera 2, the measuring device 7 extracts a red image from the red flash generated by the ACL 3 through the color identifying section. At the same time, the coordinates of the center of the image are obtained by the operating section of the measuring device 7. The measuring device 7 obtains the distance from the center to the parking spot as distance information through the operating section, and displays the distance information on the display unit 4 on the ground.

Assume that the CCD camera 2 is set on one side of the approach line 6 by using the line 6 as a reference, and the approach line 6 is set in the field of view of 100 m. In this case, if distance coordinate values are set to be $-2,560 \leq X \leq 2,550$, a distance precision of 2.0 cm is obtained.

As described above, in the aircraft docking guidance apparatus according to the first embodiment of the present invention, an ACL located on an upper fuselage of each an aircraft is imaged by the azimuth (direction) and distance measuring CCD cameras, and the difference between an approach line and a parking spot is provided as azimuth (direction) information by the measuring device on the basis of approach line, parking spot, and aircraft type data stored in advance, while the horizontal distance between the center of the ACL to the parking spot is provided as distance information.

According to the first embodiment of the present invention, since the azimuth (direction) measuring CCD camera is set on the extension line of the approach line, and the distance measuring CCD camera is set on one side of the approach line, an accurate deviation from the approach line and an accurate distance to the parking spot can be provided as azimuth (direction) and distance information, respectively.

As described above, according to the first embodiment, since an ACL located on an upper fuselage of each aircraft is used as a position reference of the aircraft, the position reference can be reliably imaged by the two CCD cameras installed on the ground even at night or in bad weathers. In this arrangement, the center of the ACL is obtained by color extraction in real time, and azimuth (direction) numerical coordinates and distance numerical coordinates are obtained by tracking the center of ACL upon movement of the aircraft, thereby displaying the obtained information on the display unit on the ground as accurate azimuth (direction) and distance information. With this display, not only a pilot but also a co-pilot can accurately stop the aircraft at the parking spot without the aid of guidance personnel stuff on the ground.

Figure 3A:
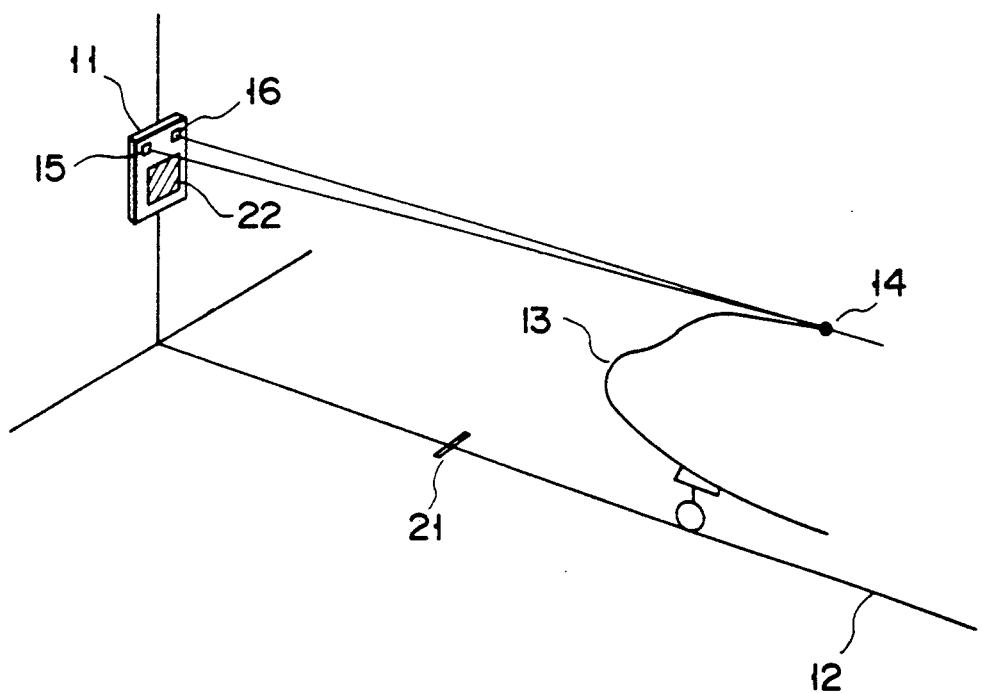
FIGS. 3A and 3B are views showing the system function of a guidance apparatus according to the second embodiment of the present invention, respectively.
Figure 3B:
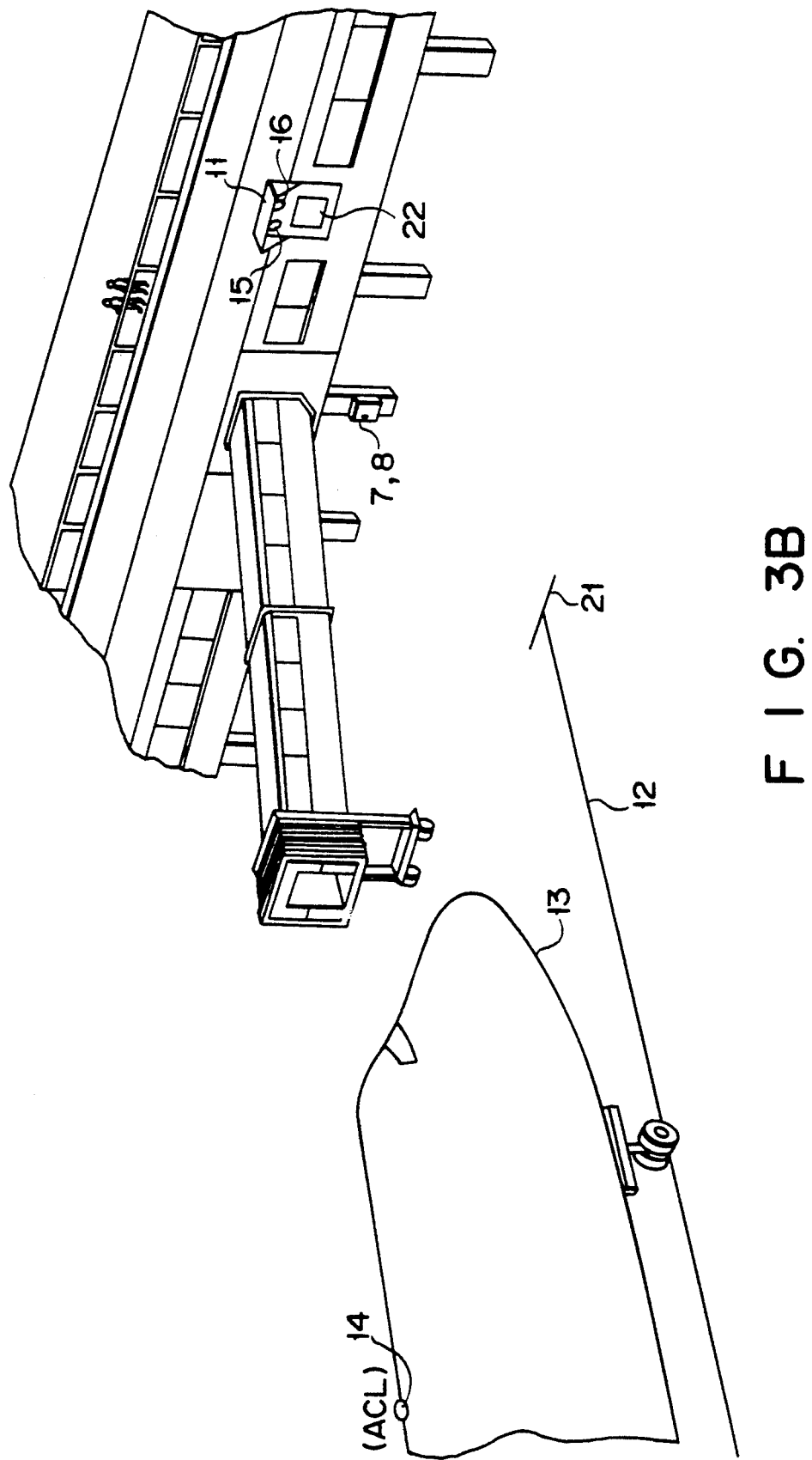
Figure 5:
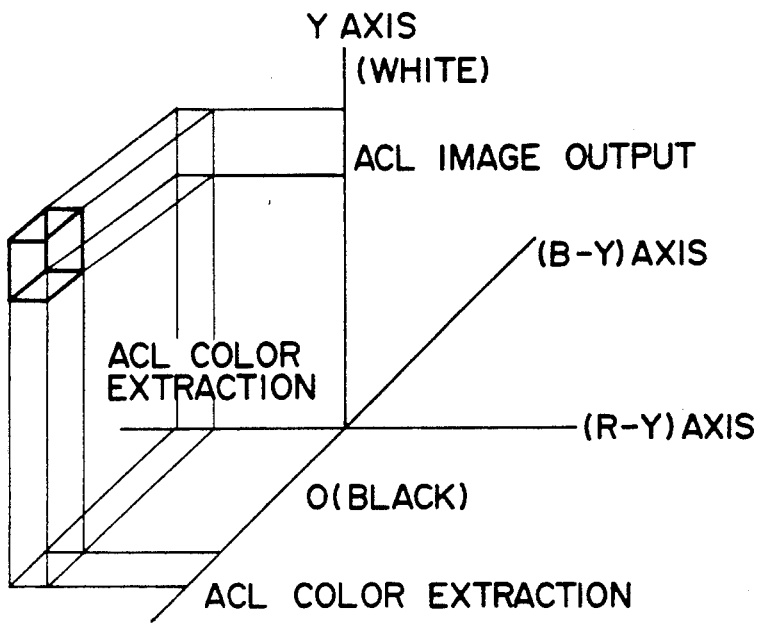
FIG. 5 is a view showing a color space and anti-collision light (ACL) extraction.
Figures 6A, 6B:
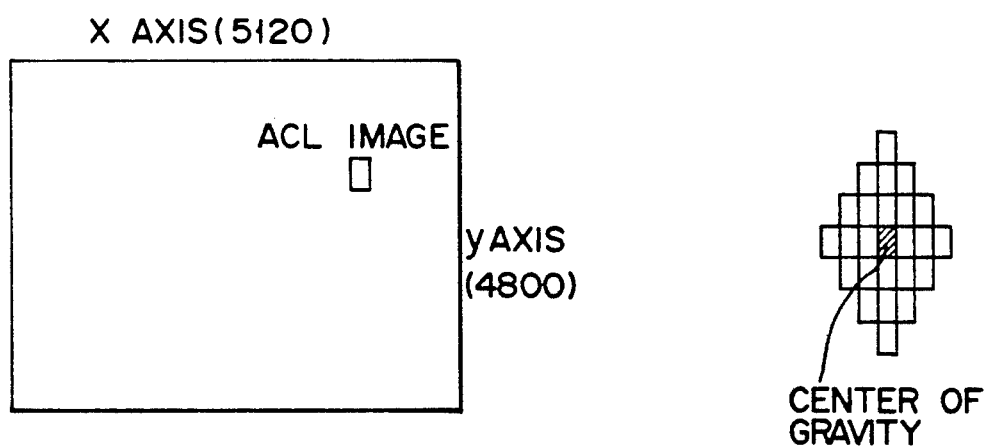
FIGS. 6A and 6B are views respectively showing a two-dimensional coordinate system on an ACL extraction frame and an enlarged ACL image.
Figure 7A:
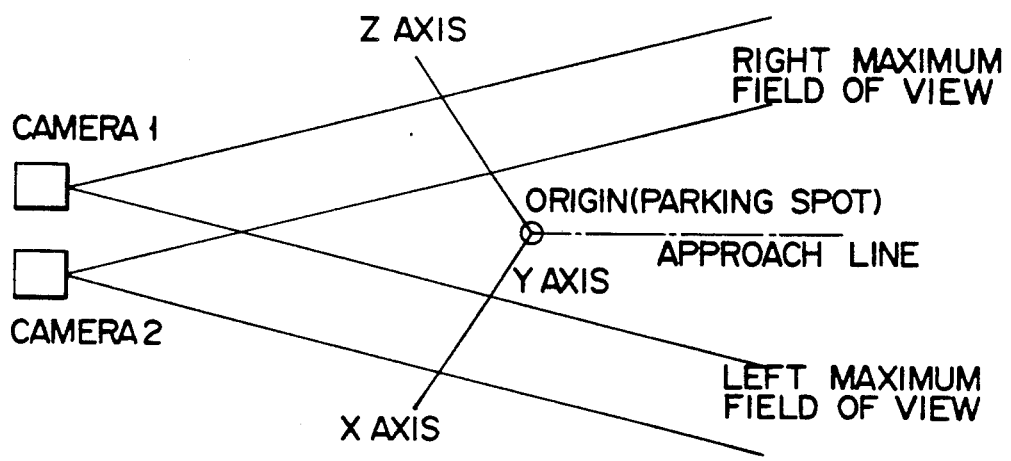
FIGS. 7A and 7B are a plan view and a side view showing a three-dimensional space coordinate system.
Figure 7B:
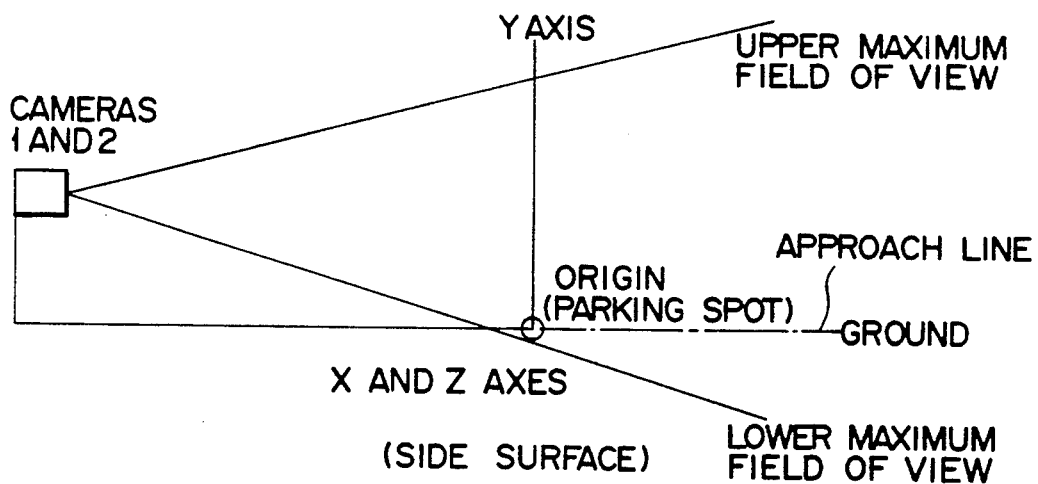

The second embodiment of the present invention will be described below with reference to the accompanying drawings. FIGS. 3A and 3B show the system function of a guidance apparatus according to the second embodiment, respectively. FIG. 3C shows the display unit of FIG. 3B. FIG. 4 shows the overall arrangement of the apparatus according to the second embodiment. FIG. 5 shows a color space and ACL extraction. FIGS. 6A and 6B respectively show a two-dimensional coordinate system on an ACL extraction frame and an enlarged ACL image. FIGS. 7A and 7B are plan and side views showing a three-dimensional space coordinate system. As shown in FIGS. 3A and 3B, and FIG. 4, in this embodiment, a display unit 11 is installed on the ground in the forward direction of an aircraft 13 at a position above the extension line of an aircraft approach line 12 formed on an apron. A red flash generated by an ACL 14 located on an upper fuselage of an aircraft approaching the apron is picked up by CCD cameras 15 and 16 arranged at the same position as that of the display unit 11 at a predetermined interval to be located on both sides of the approach line 12.

Video outputs from the CCD cameras 15 and 16 are respectively supplied to extractors 17 and 18. The extractors 17 and 18 extract only red images from the red flash generated by the ACL 14. The principle of color extraction will be described below.

An arbitrary color is represented by a combination of three colors R (red), G (green), and B (blue). If, therefore, video signals representing brightness are respectively represented by R, G, and B, a signal Y representing the brightness of a color is given by $Y = R + G + B$.

In this case, an arbitrary color is expressed by using three-dimensional signals $(R-Y)$, $(B-Y)$, and Y, instead of using the video signals R, G, and B, as shown in FIG. 5.

On a color space constituted by the $(R-Y)$ axis, the $(B-Y)$ axis, and the Y axis, the extractors 17 and 18 set the upper and lower limit values of the $(R-Y)$ and $(B-Y)$ axes representing hues, respectively, in correspondence with the hues of a red flash from the ACL, and extract ACL images within a range, on the Y axis, corresponding to the set range. More specifically, since the Y axis represents lightness, extractors 17 and 18 output monochromatic video signals in such a manner that ACL images extracted on the Y axis are white, and other portions are black.

A tracker 19 tracks the two color extraction images extracted in the above-described manner, and obtains the center of gravity of each ACL image. On the basis of the obtained two points, the tracker 19 calculates one point of a three-dimensional space coordinate system defined on the basis of a parking spot on the approach line 12 as the origin. That is, the position of the ACL 14 is three-dimensionally measured as the position reference of the aircraft 13, and tracking is performed with respect to the position reference.

In this case, the tracker 19 obtains the coordinates of the center of gravity of each ACL image from a two-dimensional coordinate plane having a coordinate value of 5120 in the horizontal direction (x axis) and a coordinate value of 4800 in the vertical direction (y axis), as shown in FIGS. 6A and 6B. Therefore, in the horizontal direction, a resolution of about 1 mm is obtained with respect to a field of view of 5 m.

The tracker 19 calculates the center of gravity of the ACL 14 every 1/30 seconds, and performs position measurement by using a three-dimensional X, Y, and Z coordinate system set on the basis of the coordinates of the center of gravity of the ACL 14 imaged by each of the two cameras, as shown in FIGS. 7A and 7B.

An arithmetic processing unit 20 calculates the difference between the ACL 14 and the approach line in the horizontal direction as azimuth (direction) information on the basis of aircraft type data input from an operation unit 23 and the position measurement data from the tracker 19. In addition, the arithmetic processing unit 20 calculates the distance from a parking spot 21 to a nose gear as distance information. The arithmetic processing unit 20 then displays the azimuth (direction) and distance information on a display lamp 22 as shown in FIG. 3C, for example.

In FIG. 3C, the display lamp 22 includes a distance displaying portion 22a, an azimuth (direction) displaying portion 22b and the other displaying portion 22c for displaying information such as a kind of aircraft.

In this case, the arithmetic processing unit 20 stores relative position data of ACLs and nose gears, approach line data, and parking spot data, which vary depending on aircraft types, in a ROM in advance. In the first step, the type of approaching aircraft is selected by the operation unit 23. When the two CCD cameras 15 and 16 image an ACL, the arithmetic processing unit 20 calculates a deviation from the approach line as azimuth (direction) information and the distance from the parking spot to the nose gear as distance information, and displays the output information on the display lamp 22.

According to the guidance apparatus of the second embodiment of the present invention, therefore, an accurate deviation from an approach line and an accurate distance to a parking spot can be provided as azimuth (direction) and distance information, respectively.

As has been described above, according to the second embodiment of the present invention, since an ACL located on an upper fuselage of each aircraft is used as a position reference of the aircraft, the position reference can be reliably imaged by the two CCD cameras installed on the ground even at night or in bad weathers. In this arrangement, the center of the ACL is obtained by color extraction in real time, and the center of ACL is tracked upon movement of the aircraft by three-dimensional measurement, thereby displaying high-precision azimuth (direction) and distance information on the display unit on the ground. With this display, not only a pilot but also a co-pilot can accurately stop the aircraft at the parking spot without the aid of guidance personnel staff on the ground.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An aircraft docking guidance apparatus comprising:
   a plurality of image pickup devices, set on the ground, for picking up images of an anti-collision light located on an aircraft to be guided;
   position reference producing means for producing a signal representing a position reference of the aircraft in accordance with picked-up image signals from said plurality of image pickup devices;
   display data producing means for producing at least one of direction information and distance information as guidance information to be provided to pilots of the aircraft in accordance with the signal representing the position reference of the aircraft which is supplied from said position reference producing means; and
   a display unit for displaying at least one of the direction information and distance information from said display data producing means at a position on the ground where the pilots can see and recognize the information.

2. An apparatus according to claim 1, wherein said plurality of image pickup devices include at least one CCD camera.

3. An apparatus according to claim 2, wherein said CCD camera includes means for imaging a red flash from the anti-collision light located on an upper fuselage of the aircraft.

4. An apparatus according to claim 3, wherein said position reference producing means includes an extractor for extracting only a red image in accordance with a picked-up image signal from said CCD camera and a tracker for tracking a color extraction image from said extractor, obtaining the center of gravity of the anti-collision light, and producing a position reference of the aircraft by three-dimensional measurement.

5. An apparatus according to claim 4, wherein said display data producing means includes an arithmetic processing unit for calculating a difference between the anti-collision light and an approach line in the horizontal direction as the direction information in accordance with aircraft type data input from an operation unit and position measurement data from said tracker, and calculating a distance from a parking spot on the approach line to a nose gear of the aircraft as the distance information.

6. An apparatus according to claim 5, wherein said display unit includes a display lamp for displaying at least one of the direction information and the distance information calculated by said arithmetic processing unit.

7. An aircraft docking guidance apparatus comprising:
   a direction measuring image pickup device, installed in a forward direction of an aircraft which is approaching an apron in an airport, for picking up an image of an anti-collision light located on the aircraft which is approaching the apron;
   a distance measuring image pickup device, installed in a direction to face a side surface of an aircraft which is approaching the apron, for picking up an image of the anti-collision light located on the aircraft which is approaching the apron;
   a measuring device for extracting an anti-collision light image from picked-up image outputs from said distance measuring image pickup device and said direction measuring image pickup device, calculating a difference between the center of the anti-collision light image and an aircraft approach line to obtain direction information, and calculating a distance from the center of the anti-collision light to a parking spot for the aircraft to obtain distance information; and
   a display unit for receiving and displaying the direction information and the distance information from said measuring device.

8. A method for providing a docking guidance to an aircraft, said method comprising the steps of:
   picking up images of an anti-collision light located on an aircraft by using a plurality of image pickup devices;
   producing a position reference of the aircraft on the basis of picked-up image signals from said plurality of image pickup devices; and
   producing at least one of direction information and distance information as the docking guidance in accordance with the position reference of the aircraft and providing the information to the aircraft through a display unit on the ground.

* * * * *